United States Patent
Mears et al.

(10) Patent No.: US 6,707,508 B1
(45) Date of Patent: Mar. 16, 2004

(54) CHANNEL ENTRY FOR SELECTION OF A CHANNEL

(75) Inventors: Mark Gilmore Mears, Zionsville, IN (US); Mark Sheridan Westlake, Fishers, IN (US); Aaron Hal Dinwiddie, Cicero, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 35 days.

(21) Appl. No.: 10/031,051

(22) PCT Filed: Jul. 14, 2000

(86) PCT No.: PCT/US00/19183

§ 371 (c)(1),
(2), (4) Date: Jan. 15, 2002

(87) PCT Pub. No.: WO01/06776

PCT Pub. Date: Jan. 25, 2001

Related U.S. Application Data (60) Provisional application No. 60/144,339, filed on Jul. 16, 1999.

(51) Int. Cl.[7] ............................. H04N 5/50; H04N 5/445
(52) U.S. Cl. ........................ 348/731; 348/563; 348/569; 348/570; 348/555; 725/38; 725/40
(58) Field of Search ................................. 348/731, 732, 348/563, 564, 569, 570, 555, 554; 725/38, 39, 40, 56, 57, 59; 455/179.1, 188.1, 3.02, 193.1, 180.1

(56) References Cited

U.S. PATENT DOCUMENTS

| | | | | | |
|---|---|---|---|---|---|
| 5,973,750 | A | * | 10/1999 | Ogawa et al. | 348/570 |
| 6,111,611 | A | * | 8/2000 | Ozkan et al. | 348/465 |
| 6,137,539 | A | * | 10/2000 | Lownes et al. | 348/569 |
| 6,188,448 | B1 | * | 2/2001 | Pauley et al. | 348/731 |
| 6,198,513 | B1 | * | 3/2001 | Cherrick | 348/731 |
| 6,249,320 | B1 | * | 6/2001 | Schneidewend et al. | 348/569 |
| 6,262,780 | B1 | * | 7/2001 | Ho et al. | 348/734 |
| 6,281,940 | B1 | * | 8/2001 | Sciammarella | 348/564 |
| 6,285,414 | B1 | * | 9/2001 | Chilamakuri | 348/734 |
| 6,334,217 | B1 | * | 12/2001 | Kim | 725/38 |
| 6,480,707 | B1 | * | 11/2002 | Hirose et al. | 455/179.1 |
| 6,507,951 | B1 | * | 1/2003 | Wugofski | 725/59 |

* cited by examiner

*Primary Examiner*—John Miller
*Assistant Examiner*—Jean W. Désir
(74) *Attorney, Agent, or Firm*—Joseph S. Tripoli; Ronald H. Kurdyla; Joel M. Fogelson (57) ABSTRACT

A system and method for processing a channel entry is presented. In one embodiment, the receiving mode of an apparatus is first determined. A first channel entry format is then displayed, if it is determined that the apparatus in the first receiving mode. A second channel entry format is displayed, instead, if it is determined that the apparatus in the second receiving mode. Furthermore, the first channel entry format comprises a first and a second information portions and the second channel entry format comprises a third information portion.

20 Claims, 6 Drawing Sheets

CHANNEL ENTRY FOR SELECTION OF A CHANNEL

This application claims the benefit under 35 U.S.C. §365 of Internation Application PCT/US00/19183, filed Jul. 14, 2000, which was published in accordance with PCT Article 21(2) on Jan. 25, 2001 in English; and which claims benefit of U.S. provisional application serial no. 60/144,339 filed Jul. 16, 1999.

FIELD OF THE INVENTION

Present invention generally relates to a system and method of video selection processing in, for example, a video apparatus or the like, capable of receiving a digital and/or analog television signal; and more particularly to a system and method for processing entry and/or selection a channel.

BACKGROUND OF THE INVENTION

In analog-only TV environment, tuning directly to an analog (e.g., NTSC or PAL) television channel was relatively easy using a remote control device. A user would typically use a number keypad on a remote control to press the digits corresponding to the desired channel. For channels with only one digit (e.g., channel 6), the user would typically have to enter a leading zero before the channel number in order to fill up the buffer of two digits. For example, the user would enter "0" then "6". For channels of two digits, the user would enter the two digits, after which the TV would immediately tune to the desired channel after receiving two digits. For some remote controls, a user would press an "enter" key after the channel digit entry, so that the video apparatus would immediately turn to the entered channel, without delay.

When Cable TV was introduced, three-digit channels became common and various methods were used to facilitate three-digit channel entry. These methods include, for example, a "100" key on the remote, or a "long-1" method (i.e., holding the "1" digit key for a longer-than-usual period would allow for a three-digit entry), etc.

In the past, tuning to channels in a satellite system, such as a DIRECTTV® Integrated Receiver-Decoder (IRD), made by, for example, Hughes Electronics or Thomson Consumer Electronics, was straightforward, too. DIRECTTV channels have used three digits in length (e.g., range from 100 to 999). Therefore, all a user has to do is to enter a three-digit channel number and the DIRECTTV system will immediately tune to the channel after the third and final digit is entered. In the future, however, DIRECTTV may have from 1 to 9,999 channels, or include subchannels.

The introduction of digital television further complicates channel entry and selection. One example of a digital television is high definition television (HDTV) which complies with Digital Television Standard for HDTV Transmission standard of, for example, Apr. 12, 1995, prepared by the United States Advanced Television Systems Committee (ATSC) or other ATSC standards. A digital television broadcaster under such standards may choose to either broadcast one high definition digital signal (e.g., a main or major channel) or the broadcaster may choose to split the digital television signal into multiple standard definition "subchannels" or "minor channels" if he so desires (which is called "multicasting").

A digital ATSC channel which is broadcasting a single high definition channel (i.e., is not multicasting multiple standard definition channels) will always have a subchannel number of "1". A digital ATSC channel which is broadcasting multiple standard definition channels (i.e., is multicasting) can have multiple subchannels ranging from "1" to "999". Exemplary illustrations of how major and minor channel numbers are transmitted, processed and displayed is disclosed, for example, in U.S. application Ser. No. 09/057,646, entitled "A System and Method for Displaying Major and Minor Channel Numbers", and also in a Continuation Application of that application, U.S. application Ser. No. 09/218,518, filed Dec. 22, 1998, both assigned to the same assignee of the present invention. Therefore, digital channels may have major and minor channel numbers, unlike analog channel, which do not have a subchannel. Likewise, satellite broadcast, such as DIRECTTV, currently does not have subchannel associated with its transmission.

SUMMARY OF THE INVENTION

The present inventors recognize that it is desirable to be able to provide a channel entry and selection system and method which is easy and intuitive to users in an environment of having one or more broadcast formats. The present inventors recognize that a user-friendly solution must be provided to handle the differing lengths of direct digit entry of channels for different signal sources (e.g., analog, digital, satellite), as well digital subchannels.

The present invention, therefore, provides a system and method of channel selection in a receiving apparatus, which is capable of receiving a program, which may occupy a high definition channel or only a subpart (e.g., a subchannel) of the high definition channel. Also, the present invention may also be used to select an analog television program and/or satellite broadcasting programs.

Therefore, in one form, the present invention is a method for processing channel entry, comprising the steps of:
 displaying a first field;
 displaying a second field;
 determining if there is an entry to the first field;
 determining if there is an entry to the second field; and
 if there is an entry only to the first but not the second field based on the previous determining steps, then tuning to a first available channel and with a major channel number corresponding to the entry in the first field.

In another form, the present invention is a method of processing channel entry, comprising the steps of:
 determining whether the apparatus is in a first or a second receiving mode;
 displaying a first channel entry format if it is determined that the apparatus in the first receiving mode, in response to the determining step;
 displaying a second channel entry format if it is determined that the apparatus in the second receiving mode, in response to the determining step; and
 wherein the first channel entry format comprises a first and a second information portions and the second channel entry format comprises a third information portion.

DETAILED DESCRIPTION

Figure 1:
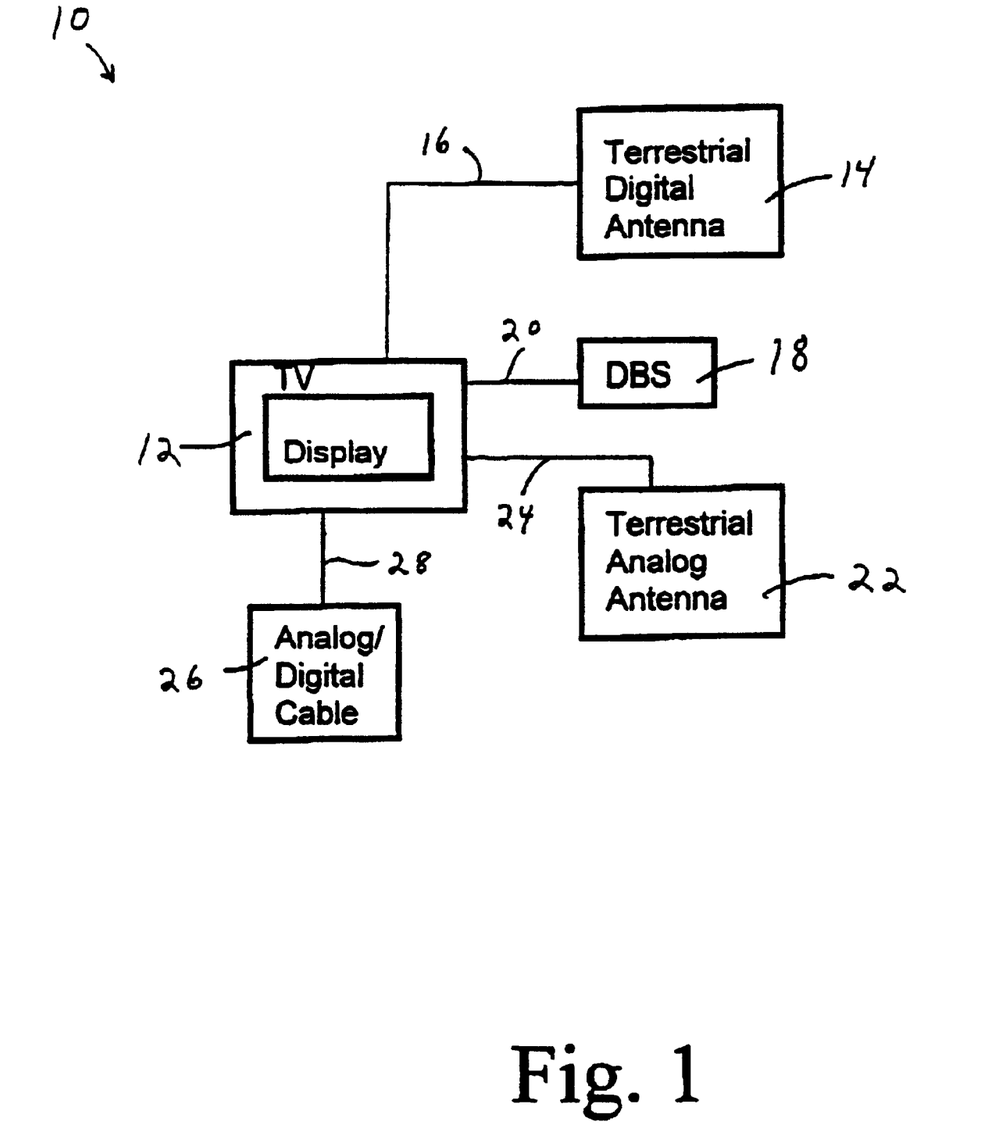
FIG. 1 is a block diagram of an exemplary system in which the present invention is utilized.

With reference to FIG. 1, there is shown a block diagram of a system, generally designated 10, which may utilize the present invention. It should be initially appreciated that the system 10 depicted in FIG. 1 is only exemplary and/or representational of the many systems that may utilize the principles of the present invention.

The system 10 includes a television apparatus that may or may not include a monitor or other similar display device (collectively "television apparatus") generally designated 12. The television apparatus 12 is adapted through appropriate circuitry, software, and/or other components to decode and process digitally modulated analog audio and video television signals or transmissions ("digital television signals") from a Direct Broadcast Satellite (DBS) system 18 as received via a link or line 20. Such signals may be digitally modulated using the QPSK (Quadrature Phase Shift Keying) format. The television apparatus 12 is also adapted through appropriate circuitry, software, and/or other components to decode and process digital television signals from terrestrial Digital Television (DTV) antenna 14 as received via a link or line 16, such as ATSC DTV. Such signals may be digitally modulated using VSB (Vestigal SideBand).

The television apparatus 12 is also adapted through appropriate circuitry, software, and/or other components, to process analog audio and video television signals ("analog-television signals") from a terrestrial analog antenna 22 as received via a link or line 24, as well as analog television signals from a CATV system 26 via a link or line 28. Such processing typically includes digitizing the video and/or audio signals through appropriate circuitry, software, and/or other components. Digital television signals from the CATV system 26 are also decoded and processed as indicated above. It should be appreciated that the television apparatus 12 is adapted to receive and process analog and/or digital television signals from sources other than that shown.

As an example of the above, the television apparatus 12 may be a model DTC 100 or DM1, from Thomson Consumer Electronics, Inc. of Indianapolis, Ind. In any form, the television apparatus 12 typically includes appropriate circuitry, software, and other components to support/provide a display, an integral control system, a user-interface and on-screen display (OSD) functionality. It should be appreciated that the television apparatus 12 may take other forms and have additional capabilities and/or functionality other than those shown and/or discussed through appropriate circuitry, software, and/or other components.

Figure 2:
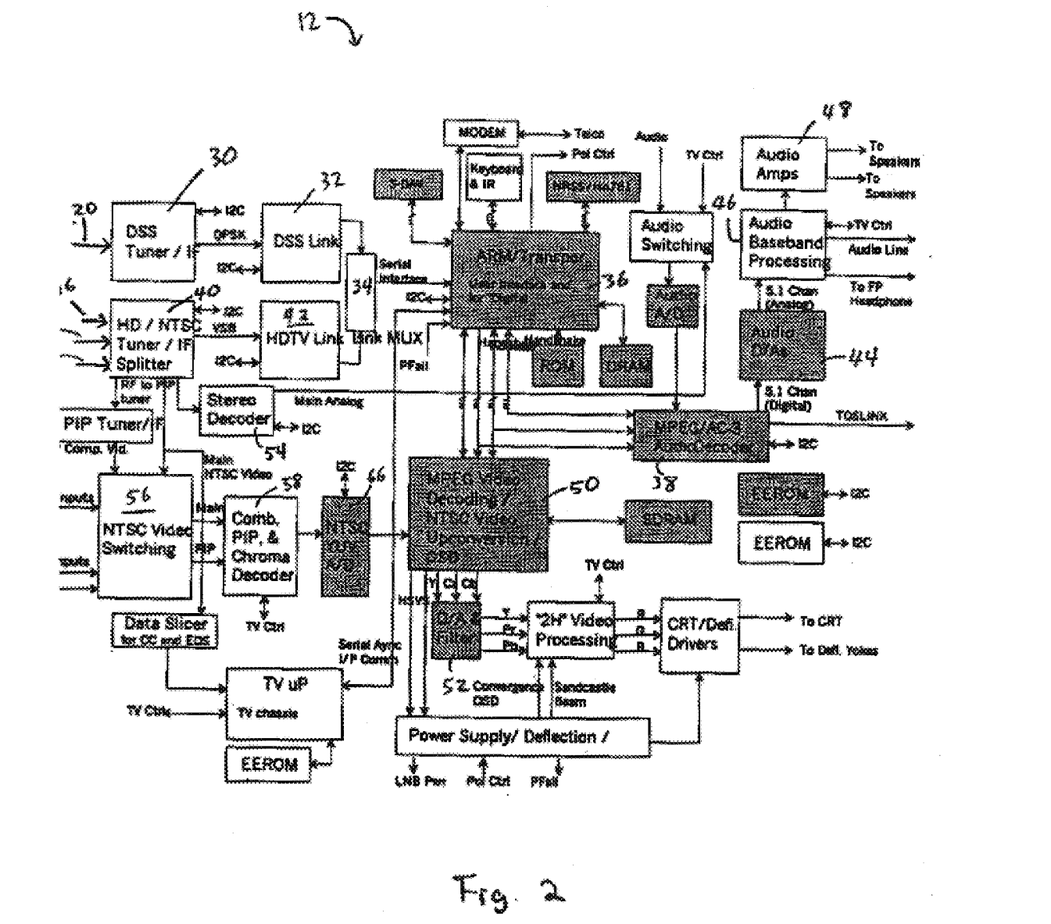
FIG. 2 is a diagram of an exemplary apparatus circuit as used in the system of FIG. 1 incorporating the principles of the present invention.

Referring to FIG. 2, there is shown a block diagram of at least some of the various components of the DTC 100 television apparatus 12. The DTC 100 television apparatus 12 is adapted through appropriate circuitry, software, and/or other components, to receive and process digital television signals and analog television signals. The various blocks and interconnections depicted in FIG. 2 are exemplary of a television capable utilizing analog and digital television signals. Thus, variations in the interconnections and components may vary.

The television apparatus 12 includes a direct broadcast satellite tuner/IF converter 30 that is adapted to receive a digital television signal (audio, video, and VBI/other) via line 20, allows tuning to the various channels of the digital television signal, converts the digital television signal into an Intermediate Frequency (IF), and sends the IF digital television signal (here shown as QPSK modulated) to a DSS link 32. The DSS link 32 demodulates the IF digital television signal and forwards the resulting digital television signal to a link multiplexer (MUX) 34. The link MUX 34 selectively sends the digital television signal to an ARM transport 36. The ARM transport 36 extracts a digital audio signal that is sent to an MPEG/AC-3 audio decoder 38. The audio decoder 38 decodes the digital audio signal, and sends the decoded digital audio signal to a digital to analog (D/A) converter 44. The D/A converter 44 sends the resulting analog audio signal to an audio processor 46 which send the process analog audio signal to audio amps 48 that are connected to audio speakers.

The ARM transport 36 also extracts a digital video signal that is sent to the decoder 50. The decoder 50 provides necessary MPEG circuitry and/or software to decode the digital video signal. The decoded digital video signal is sent to a digital to analog (D/A) converter and filter 52 to provide an analog television signal for further processing before being forwarded to the display.

The television apparatus 12 also includes a High Definition (HD)/NTSC tuner/IF converter and splitter 40 that receives an HD digital television signal (audio, video, and VBI/other) from the terrestrial digital antenna 14 via line 16, allows tuning to the various channels of the HD digital television signal, converts the HD digital television signal into an Intermediate Frequency (IF), and sends the HD IF digital television signal (here shown as VSB modulated) to an HDTV link 42. The HDTV link 42 demodulates the HD IF digital television signal and forwards the resulting digital signal to a link multiplexer (MUX) 34. The link MUX 34 selectively sends the digital signal to an ARM transport 36. The ARM transport 36-extracts a digital audio signal that is sent to an MPEG/AC-3 audio decoder 38. The audio decoder 38 decodes the digital audio signal, and sends the decoded digital audio signal to a digital to analog (D/A) converter 44. The D/A converter 44 sends the resulting analog audio signal to an audio processor 46 which send the process analog audio signal to audio amps 48 that are connected to audio speakers.

The ARM transport 36 also extracts a digital video signal that is sent to the decoder 50. The decoder 50 provides necessary MPEG circuitry and/or software to decode the digital video signal. The decoded digital video signal is sent to a digital to analog (D/A) converter and filter 52 to provide an analog television signal for further processing before being forwarded to the display.

The High Definition (HD)/NTSC tuner/IF converter and splitter 40 also receives digital television signals from the digital cable source 26 via line 28 and processes them in the same manner as for the terrestrial digital television signals. Additionally, the High Definition (HD)/NTSC tuner/IF converter and splitter 40 provides PIP (Picture-In-Picture) capabilities.

The High Definition (HD)/NTSC tuner/IF converter and splitter 40 also receives analog (NTSC) television signals from the terrestrial analog antenna 22 via line 24 and from the analog cable source 26 via line 28. The analog television signal is tuned by the tuner to a channel of the television signal and provides an IF analog television signal to an NTSC video switcher 56. The NTSC video switcher 56 provides the analog television signal to an initial comb filter/PIP and Chroma decoder 58 after which the analog television signal is sent to an NTSC YUV A/D converter 66 before being sent to the decoder 50.

The television signal decoding integrated circuit (IC) or chip 50 performs combing, picture-in-picture (PIP), chroma decoding and digitizing, MPEG video decoding, NTSC and PAL video upconversion, OSD, and other functions. Such a decoding IC may be an HMP8117 Video Decoder from Intersil Corporation of Palm Bay, Florida (formally Harris Semiconductor of Harris Corporation of Melbourne Florida), the Harris Semiconductor Data Sheet of January 1999, File Number 4643, of which is specifically incorporated herein by reference.

Hence, the exemplary television as described above, is able to receive and process not only analog (for example, NTSC), digital (for example, ATSC) or terrestrial (local), but also direct satellite broadcast. As mentioned previously, the present inventors recognize that it would be desirable to provide a userfriendly solution for handling channel-entry for each of the signal sources. The present inventors therefore provide in one embodiment of the solution which shares in common that after entering the channel number, the user is to press a "OK" or "enter" key on the remote control to confirm the entry (if the user does not press OK or the like key, the unit will clear the entry and will not tune). Confirming the channel entry with the explicit action of pressing, for example, an "OK" key on the remote may not be something previously required in, for example, TVs from Thomson Consumer Electronics.

Figure 3:
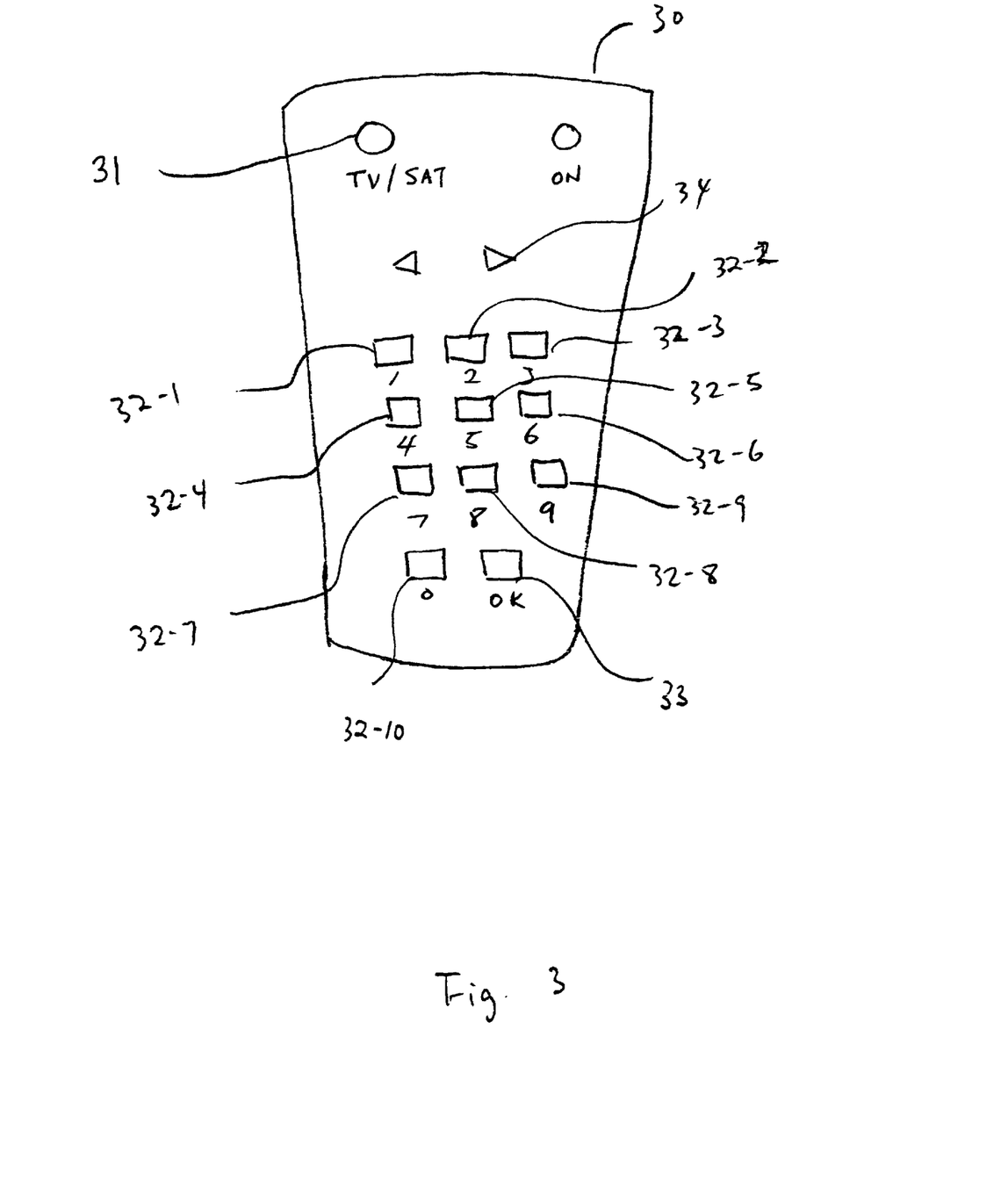
FIG. 3 is an exemplary user control device for use with the present invention.

FIG. 3 is an exemplary illustration of a user control device for use with the invention. As shown in FIG. 3, remote control 30 may have a toggle switch 31 for selecting the reception for television programs (either analog or digital) or satellite programs. Remote 30 also has digit keys 32-1 to 32-10 for entering channel number, and an "OK" key 33 for confirming channel entry. The function of these and other keys will be further explained below.

HANDLING CHANNEL ENTRY IN TV MODE

Figure 4:
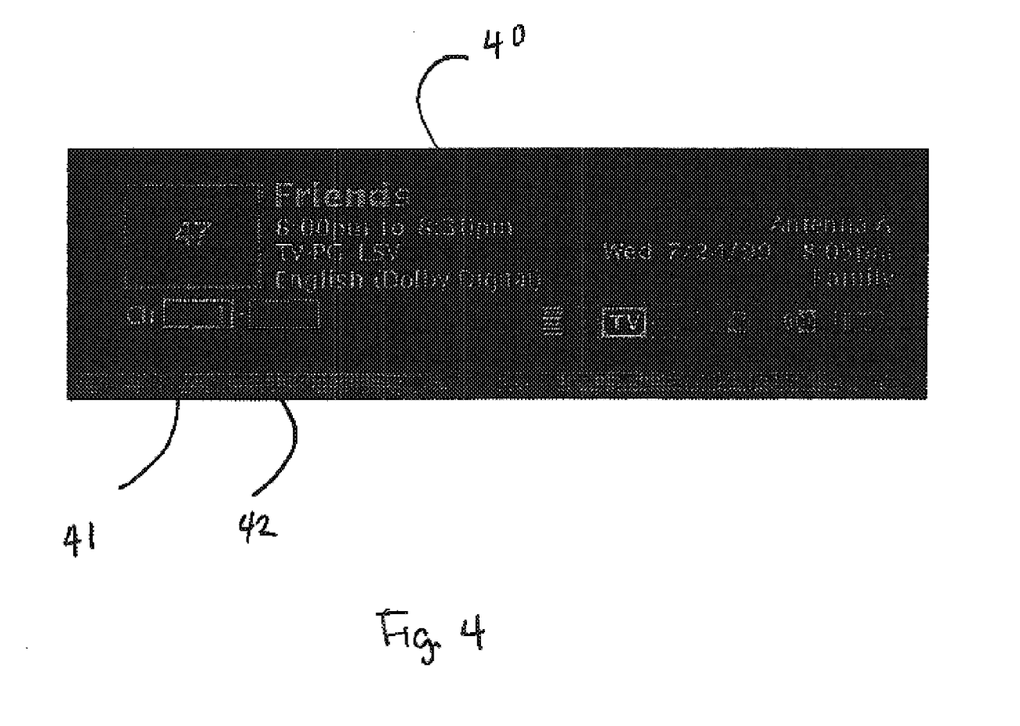
FIG. 4 is an exemplary channel entry display for use with the present invention.

As mentioned previously, a user may select either to receive broadcast or cable television programs (e.g., "TV") or satellite programs via, for example, a toggle switch 31 shown in FIG. 3. When in TV mode (for example, receiving NTSC and/or ATSC channels), if a user presses a digit key 32-1 to 32-10 on a remote control 30, he or she is presented with two side-by-side digit-entry fields, or information portions, 41 and 42, in for example, a channel banner 40, as shown in FIG. 4. The left field 41 is for main channel entry and the right field 42 is for subchannel entry.

An exemplary embodiment may be that each field is capable of holding three digits apiece, since the maximum length of a TV main channel (whether analog or digital) is three digits and the maximum length of a digital subchannel is three digits according to current standards, for example. Of course, although the exemplary embodiment shown in FIG. 4, has the representation that the two entry fields or information portions are separated by blank spaces, other representations are possible. For example, another embodiment may be that the two information portions or fields are separated by a delimiter such as a dash line, a dot or a decimal symbol.

According to the principles of the present invention, to tune directly to an analog NTSC channel, the user needs only to enter a main channel number and press the OK key 33 on, for example, remote 30 to confirm the channel entry. This is because NTSC channels are not capable of having subchannels; hence the user and the unit can ignore the subchannel field.

To tune directly to a digital ATSC channel which is broadcasting a single high definition channel (i.e., is not multicasting multiple standard definition channels) a user needs to enter a main channel number and press the OK key 33 on the remote to confirm the entry.

Figure 6:
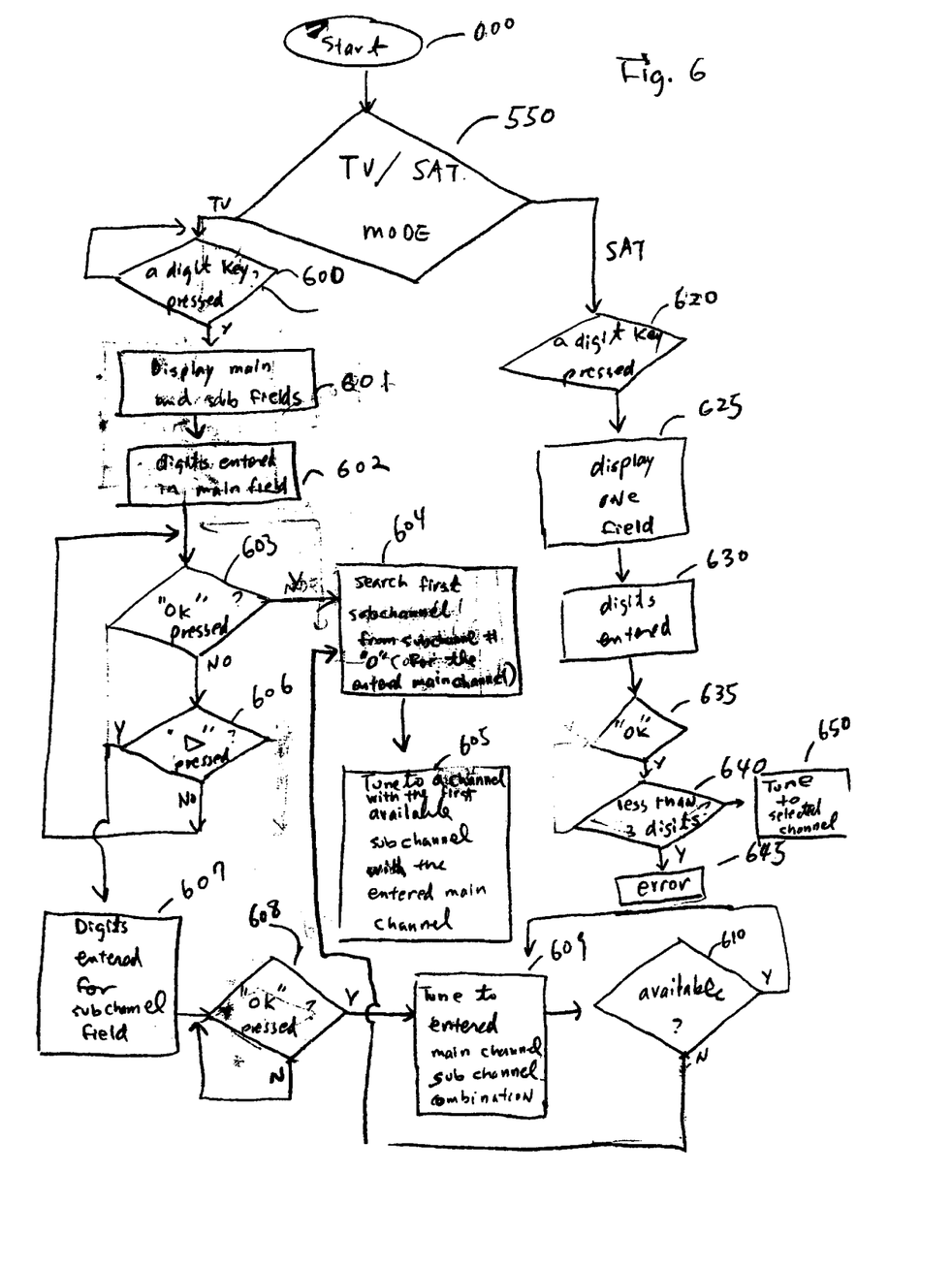
FIG. 6 is an exemplary flow diagram according to the principles of the invention.

To tune directly to a specific subchannel of a digital ATSC channel which is broadcasting multiple standard definition channels (i.e., is multicasting subchannels), a user needs to enter a main channel number in the main field 41 first, as shown in step 602 of FIG. 6. The user then presses, for example, a right arrow key 34 on remote 30 to move to subchannel field 42, as shown in step 606 of FIG. 6. In another embodiment, a delimitor key represented by, for example, a dash, dot or period may be used to move the cursor or the like to the subchannel field.

In another embodiment, if three digits are entered by the user in the main information portion 41, the cursor or focus will be moved automatically to the subchannel field 42.

The user would then enter the digits for the desired subchannel, as in step 607, and then press the OK key 33 on remote 30, as in step 608, to confirm the channel and subchannel entry. By pressing the right arrow key 34, the user is indicating a readiness to enter the subchannel number. Once the highlight is on the subchannel field 42, if the user presses the left arrow key, the highlight moves back to the main-channel entry field 41 and any entry in either field is cleared.

According to another principle of the invention, If a user only enters a main channel number and no subchannel number (for example, "8, OK") in the TV mode, then transparent and invisible to the user, the unit will automatically enter a "0" (zero) digit into the subchannel field 42 so that the unit will automatically start searching for a channel with the "0" subchannel number, as shown in step 604 of FIG. 6. A "0" subchannel in this case simply denotes an analog channel. Analog channels do not technically have a subchannel and since valid subchannels only range from 1–999.

If the unit finds the analog channel (channel 8 or 8-0, which is equivalent), it will tune to it. If the unit does not find "8" or "8-0", the unit will then search for all subchannels of that main channel, starting with 1 (e.g., a digital main channel) and going to 999 (e.g., 8-1, 8-2, 8-3, 8-4 . . . 8-8-998 , 8-999, etc.) until it finds a channel having a first available subchannel number for that main channel, as shown in step 605. Therefore, even though a digital ATSC channel which is broadcasting a single high definition channel (e.g. a main or major channel) will always have a subchannel of "1", the user does not need to know this or need to enter a "1" in the subchannel field since in starting its search of subchannels from "0", the unit will find the first available subchannel. In another embodiment, the search may start with the highest subchannel or just start searching all digital channels and skipping the analog channel.

In addition, if a user enters a valid main channel number but then enters a subchannel that is invalid for that main channel number (i.e., no subchannel exists for that main channel), the unit will tune to the first available subchannel available for that main channel number as shown in steps 609–610, 604 and 605. This first available subchannel may be the lowest, highest or the nearest valid subchannel depending on user preference. Therefore, one aspect of the present invention is the ability of the present invention to find valid subchannels or the main analog (i.e., subchannel="0") or digital (i.e., subchannel="1") channel, without the user knowing the types of channels being used for a particular program or needing to explicitly enter the subchannels.

The above entry method is also compatible with channel number display scheme in some electronic program guides (EPGs), where digital channels are displayed with main channel numbers to the left of a "dash" character, and sub-channel numbers to the right of the "dash character" (e.g., 25-1, 25-2, 25-3, 26-3, 55-99, etc.).

HANDLING CHANNEL ENTRY IN SATELLITE MODE

Figure 5:
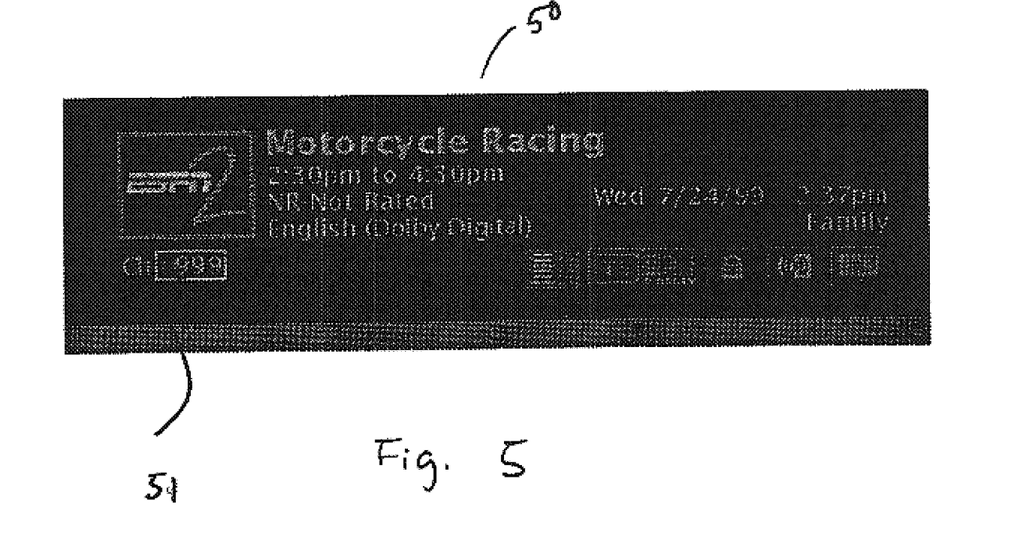
FIG. 5 is another channel entry display for use with the present invention.

When a video apparatus such as unit 12 is in a satellite receiving mode, if a user presses a digit key on the remote control, he is presented with only one channel-entry field 51, as shown in FIG. 5, and described in steps 620 and 625 of FIG. 6. This is because DIRECTTV satellite channels do not currently have subchannels. In the satellite mode, channel-entry field 51 is capable of accepting channels of either three or four digits in length, ranging from 100 to 9999. In one embodiment of the invention, if the user enters less than three digits and presses OK, the text string "???" is flashed in the channel-entry field 51 to indicate an invalid entry, as shown in steps 640 and 645 of FIG. 6. The user may then try another channel entry. In another embodiment where a valid satellite channel may range from 1–9999, no such error message will be generated. The system will simply attempt to tune to the entered channel.

Therefore, present invention provides at least a quick and efficient way for the user to indicate exactly what channel and subchannel he desires. It also relieves the user from having to remember what type of channel (e.g., digital or analog) or what a channel's valid subchannels are. In addition, although an OK or similar function key may be used after entering digits to confirm channel entry, it has at least the advantages of: 1) the user does not need to wait a certain amount of time for the unit to accept the channel entry, 2) the user does not need to enter "leading zeroes" before a channel number [e.g., instead of entering "0, 0, 8" to get channel 8, the user only has to enter "8, OK" to get to channel 8], 3) because the user can clear an incorrect subchannel or channel entry when entering a digital channel, if the user starts a channel-entry incorrectly, he can edit the channel before pressing OK. However, one skilled in the art can readily recognize that other implementations one possibility which may not require a user to press OK or other similar confirmation key. For example, the user may have to enter leading zeroes or a timer may be used to determine end of user entry, as described above.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for processing channel entry, comprising the steps of:
   displaying a first field;
   displaying a second field;
   determining if there is an entry to the first field;
   determining if there is an entry to the second field; and
   if there is an entry only to the first but not the second field based on the previous determining steps, then tuning to a first available channel with a major channel number corresponding to the entry in the first field.

2. The method of claim 1 wherein the first available channel comprises an analog television channel.

3. The method of claim 1 wherein the first available channel comprises a single high definition channel.

4. The method of claim 1 wherein the first available channel is the channel having the lowest available subchannel number and the main channel number corresponding to the entry in the first field.

5. The method of claim 1 wherein the entry to the first field is by numeric digits.

6. The method of claim 1 wherein the entry to the second field is by numeric digits.

7. The method of claim 5 wherein the numeric digits are followed by a confirmation key.

8. A method of processing channel entry, comprising the steps of:
   determining whether the apparatus is in a first or a second receiving mode;
   displaying a first channel entry format if it is determined that the apparatus in the first receiving mode, in response to the determining step;
   displaying a second channel entry format if it is determined that the apparatus in the second receiving mode, in response to the determining step; and
   wherein the first channel entry format comprises a first and a second information portions and the second channel entry format comprises a third information portion.

9. The method of claim 8 wherein the first information portion comprises a major channel number.

10. The method of claim 9 wherein the second information portion comprises a minor channel number.

11. The method of claim 8 wherein the third information portion comprises a satellite channel number.

12. The method of claim 8 wherein at least one of the first, second and third information portions comprises numeric digits.

13. The method of claim 8 further comprising the step of tuning to a channel having a major channel and minor channel numbers corresponding to the first and second information portions respectively.

14. The method of claim 8 further comprising the step of tuning to a channel having a channel number corresponding to the third information portion.

15. Apparatus for processing channel entry, comprising:
   means (50) for displaying a first field and a second field;
   means (36) for determining if there is an entry to the first field and the second field; and
   wherein if the determining means determines that if there is an entry only to the first but not the second field, then causing tuning means (40) to tuning to a first available channel with a major channel number corresponding to the entry in the first field.

16. The apparatus of claim 15, wherein the first available channel is the first tunable subchannel having the major channel number.

17. A method for processing channel entry, comprising the steps of:
- displaying a first field;
- displaying a second field;
- determining if there is an entry to the first field;
- determining if there is an entry to the second field; and
- if there is an entry to both the first and second fields then attempt to tune to a channel having a major channel number corresponding to the entry in the first field and a minor channel number corresponding to the entry in the second field.

18. The method of claim 17 further comprising the steps of tuning to a channel having the lowest valid subchannel number if the entry in the second field is not valid.

19. The method of claim 17 further comprising the steps of tuning to a channel having the highest valid subchannel number if the entry in the second field is not valid.

20. The method of claim 17 further comprising the steps of tuning to a channel having the nearest valid subchannel number to the entry in the second field if the entry in the second field is not valid.

* * * * *